Dec. 7, 1971 G. N. GASBARRO 3,624,863
POULTRY CUTTING APPARATUS
Filed May 8, 1970 6 Sheets-Sheet 1

INVENTOR.
GENO N. GASBARRO
BY
Francis L. Kremblas Jr.
ATTORNEY

Dec. 7, 1971  G. N. GASBARRO  3,624,863
POULTRY CUTTING APPARATUS
Filed May 8, 1970  6 Sheets-Sheet 2

INVENTOR.
GENO N. GASBARRO
BY
*Francis L. Kramblas Jr.*
ATTORNEY

Dec. 7, 1971  G. N. GASBARRO  3,624,863
POULTRY CUTTING APPARATUS

Filed May 8, 1970  6 Sheets-Sheet 5

INVENTOR.
GENO N. GASBARRO
BY
Francis T. Kremblas Jr.
ATTORNEY

United States Patent Office 3,624,863
Patented Dec. 7, 1971

3,624,863
POULTRY CUTTING APPARATUS
Geno N. Gasbarro, 1305 Noe Bixby,
Columbus, Ohio 43227
Filed May 8, 1970, Ser. No. 35,603
Int. Cl. A22c 21/00
U.S. Cl. 17—11                     6 Claims

ABSTRACT OF THE DISCLOSURE

An automatic poultry cutting apparatus which is adapted to sever a commercially dressed poultry body into several predetermined pieces for subsequent retail use and requires no manual handling of the body during the cutting operation. The apparatus includes a poultry retaining mandrel adapted to receive the dressed poultry body which is automatically advanced to a cutting station adjacent to a plurality of movably mounted cutting blades. The blades are synchronized with the advance of the mandrel to engage predetermined portions of the poultry body to sever the body into the predetermined number of pieces.

---

The present invention relates generally to automated poultry processing apparatus and particularly to a novel automatic poultry cutting apparatus.

Poultry is cut and packaged differently for the various retail markets, such as for example, the retail supermarket or the many types of restaurant outlets. Generally, a six, eight or nine piece cut is made depending upon the desire of the final user.

Referring to chickens specifically, cutting is generally done manually with the meat cutters holding a dressed poultry body and manually manipulating the body into contact with a rotating blade. The specific manner in which the body is manipulated differs according to the number of pieces which are desired.

Inherent in this type of operation is the danger to the meat cutter in operating in close proximity to a rotating blade and the obvious desire in making the cuts as fast as possible to increase production rates. In addition, the danger of injury is increased due to the repetitiousness of the operation which lends to boredom and possible carelessness.

In general, the cutting apparatus of the present invention comprises a frame on which a movable poultry support member is mounted which includes a plurality of mandrels adapted to receive a dressed poultry body. Each mandrel is automatically advanced in timed sequence to a cutting station located adjacent to a plurality of movably mounted cutting blades. The cutting blades automaically and synchronously engage a poultry body mounted on the mandrel disposed at the cutting station and retract after the cut is made. The cutting blades are designed to engage the poultry body at predetermined positions to sever the body into the desired number of pieces.

After the poultry body is cut it merely falls from the mandrel to a conveyor type system or the like for packaging. An operator manually loads each mandrel at a position remote from the cutting station.

It is therefore an object of the present invention to provide an apparatus which automatically cuts a poultry body into several predetermined pieces.

It is another object of the present invention to provide an apparatus of the type described which increases the poultry cutting production rates as compared to prior methods and means.

It is another object of the present invention to provide an apparatus of the type described which substantially eliminates the hazards present in manual poultry cutting operations.

It is another object of the present invention to provide an apparatus of the type described which substantially reduces the cost of processing poultry for the retail market.

It is still another object of the present invention to provide an apparatus of the type described which operates in a reliable and relatively simple manner and which is relatively inexpensive to manufacture, fabricate and maintain.

Further objects and advantages of the present invention will be apparent from the following description, reference being had to the accompanying drawings wherein a preferred form of embodiment of the invention is clearly shown.

Figure 1:
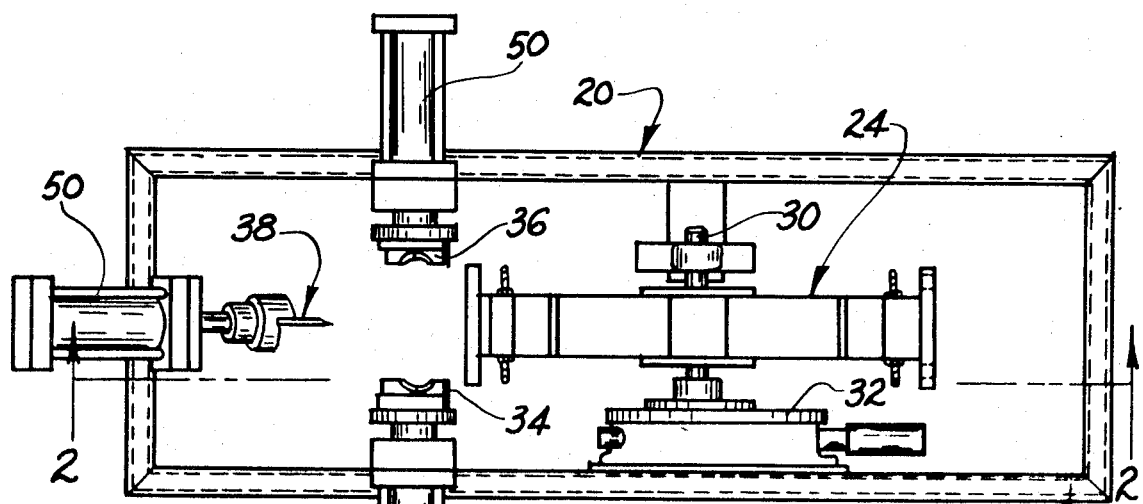
FIG. 1 is a top plan view of an automatic poultry cutting apparatus constructed in accordance with the present invention.
Figure 2:
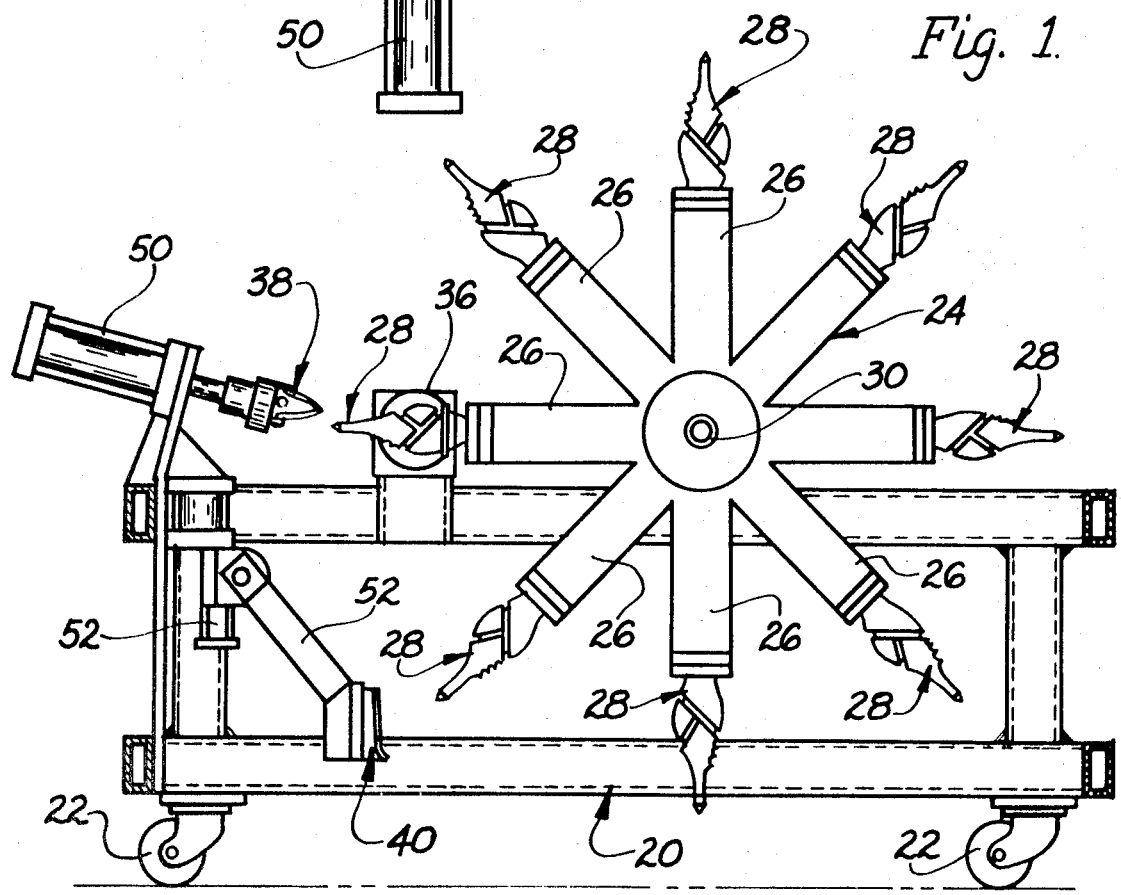
FIG. 2 is side elevational view in section of the apparatus shown in FIG. 1, the section being taken along line 2—2 in FIG. 1.

Referring in detail to the drawings, an automatic poultry cutting apparatus is illustrated in FIGS. 1 and 2 and includes a frame means, indicated generally at 20, provided with two pairs of wheels 22 for portability.

A poultry support member, indicated generally at 24, includes a plurality of outwardly extending arms 26 and is movably mounted on frame means 20. A poultry retaining mandrel 28 is mounted on the outer end of each arm 26.

In the preferred embodiment shown, support member 24 is rotatably mounted on a shaft 30 which is pneumatically driven by a conventional index table 32 provided with a Geneva movement. Employing appropriate switch means and control means which will be described later herein, each arm 26 and the respective mandrel 28 mounted thereon is sequentially advanced to a cutting station located adjacent to a plurality of cutting means, indicated generally at 34, 36, 38 and 40.

It is important to point out that other types of power sources and means for accomplishing sequential advance of arms 26 and mandrels 28 may be employed without departing from the spirit of the present invention. For example, electrical or hydraulic means could be substitnted for pneumatic means and the indexed sequential movement could be other than rotational.

Figure 5:
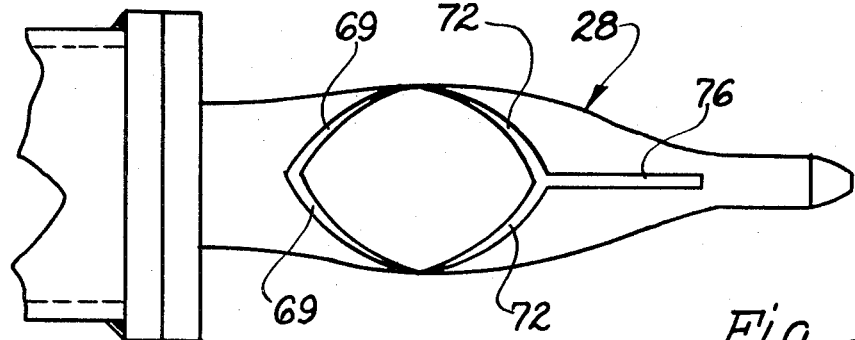
FIG. 5 is a top plan view of a portion of the apparatus shown in FIG. 1 illustrating a typical mandrel for supporting a poultry body.
Figure 6:
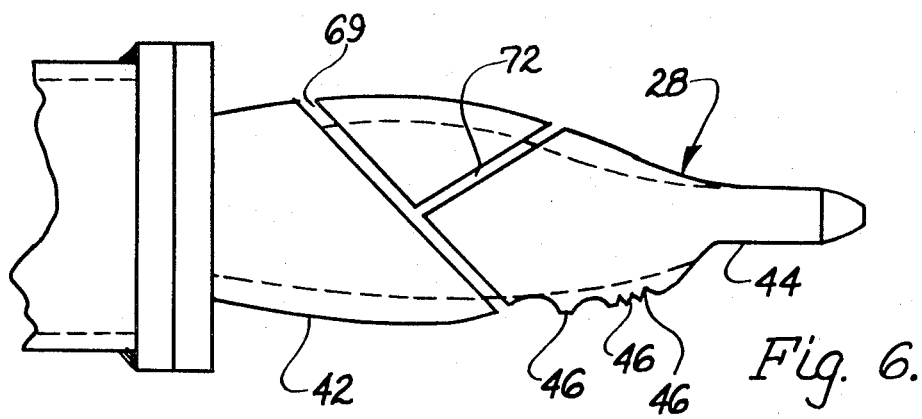
FIG. 6 is a side elevational view of the mandrel shown in FIG. 5.
Figure 7:
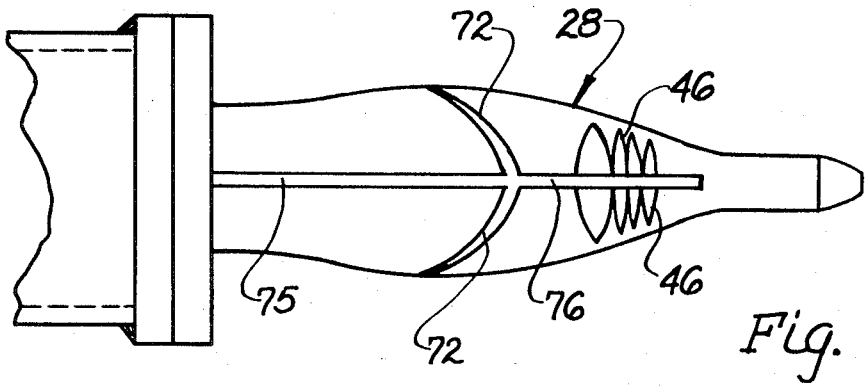
FIG. 7 is a bottom view of the mandrel shown in FIG. 5.

Referring now specifically to FIGS. 5 through 7, mandrel 28 is formed to accommodate the inner body cavity of a commercially dressed poultry body. For purposes of illustration, the remainder of the description will be addressed to chicken cutting procedure.

Mandrel 28 includes a body portion 42 and a narrowed neck portion 44. Body portion 42 is provided with a plurality of ridges 46 which are positioned to substantially conform to and engage the rib section of the chicken body positioned on the mandrel.

Body portion 42 is also provided with a plurality of slots disposed to conform with the area in which certain of the cutting means will strike the chicken body to obtain the desired number of pieces.

The dimensions of mandrel 28 must conform quite closely to the body cavity of the chicken to be cut to ensure that the chicken body remains in a relatively fixed position during the cutting operation.

This may be accomplished by obtaining a cast of the body cavity of a typical chicken in each commercial size classification. From this body cavity cast, a mold may be fashioned from which standard mandrels for each size classification can be readily made. Since commercially dressed chickens are classified in size within a tolerance of only a few ounces, a large number of chickens may be cut on the same apparatus without changing mandrels.

Further, it would be most practical to have more than one apparatus to cut each size classification, since the volume of chickens proceesed in most commercial applications would easily justify this type of an arrangement. However, it should be noted that mandrels 28 may be removably mounted on the ends of arms 26 by means of threaded fasteners or the like to permit mandrels 28 to be replaced in a relatively easy manner.

Figure 8:
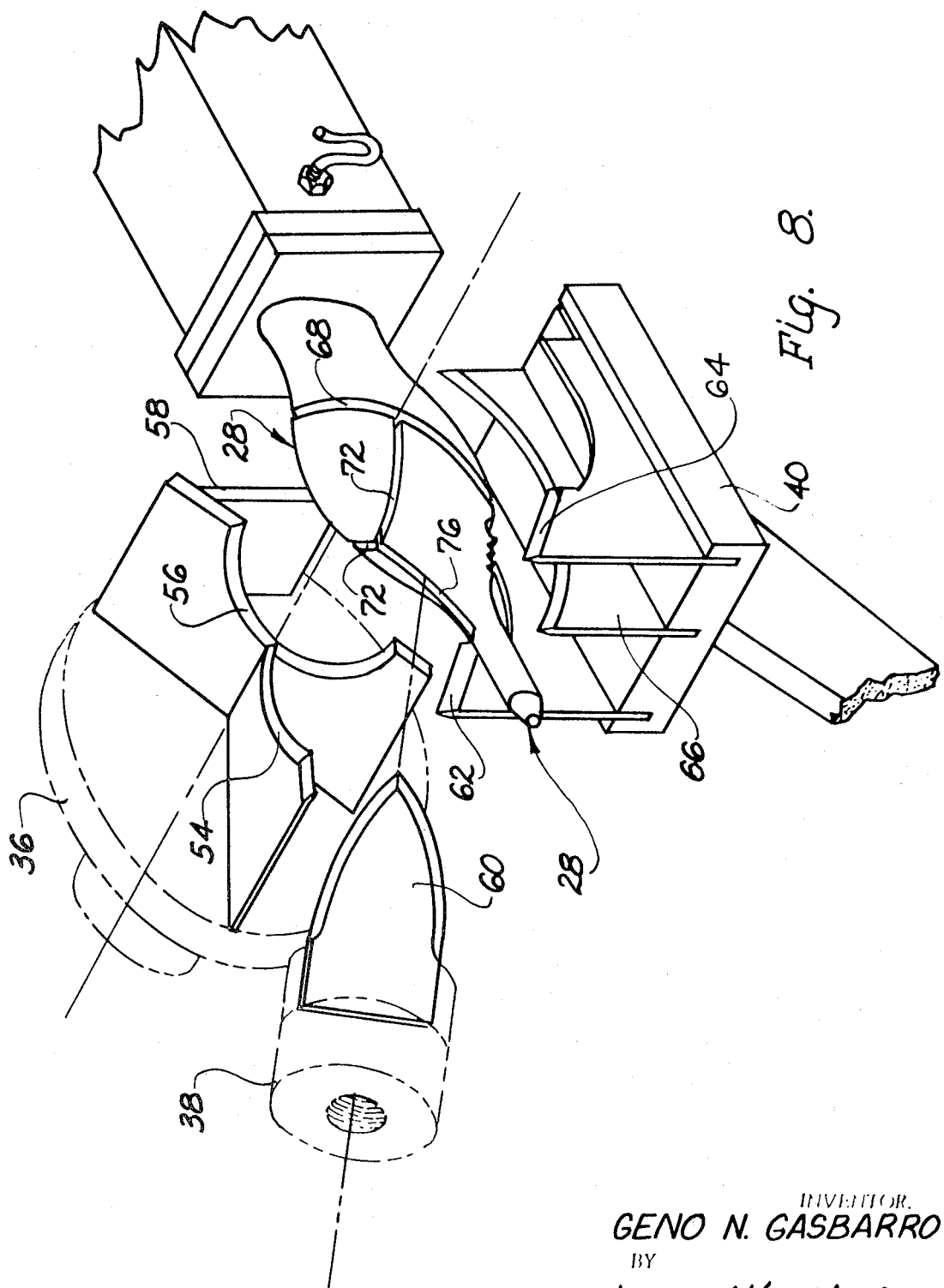
FIG. 8 is a partial perspective view of a portion of the apparatus shown in FIG. 1 illustrating the cutting means and their relationship to a mandrel disposed at the cutting station without a poultry body being mounted thereon.

Referring specifically now to FIG. 8, a partial perspective view of cutting means 36, 38 and 40 is shown. A cutting means 34 which is identical to cutting means 36 but oppositely disposed is not shown.

A mandrel 28 is illustrated being disposed at the cutting station which is defined in an area adjacent to the cutting means. The cutting means described herein are designed for a nine-piece cut, however it is important to point out that other designs are possible to sever a different number of pieces without departing from the spirit of the present invention.

Cutting means 34, 36 and 38 are reciprocally operated by conventional pneumatic cylinders 50 and cutting means 40 is operated by a conventional rotac cylinder 52 as shown in FIGS. 1 and 2.

Cutting means 36 includes a plurality of blades 54, 56 and 58. Cutting means 34 is of identical construction but mounted on the opposite side of mandrel 28 and aligned therewith to cooperate in severing certain breast portions as will be described in detail later herein.

Cutting means 38 includes a single blade 60 and cutting means 40 includes three blades 62, 64 and 66.

Figure 3:
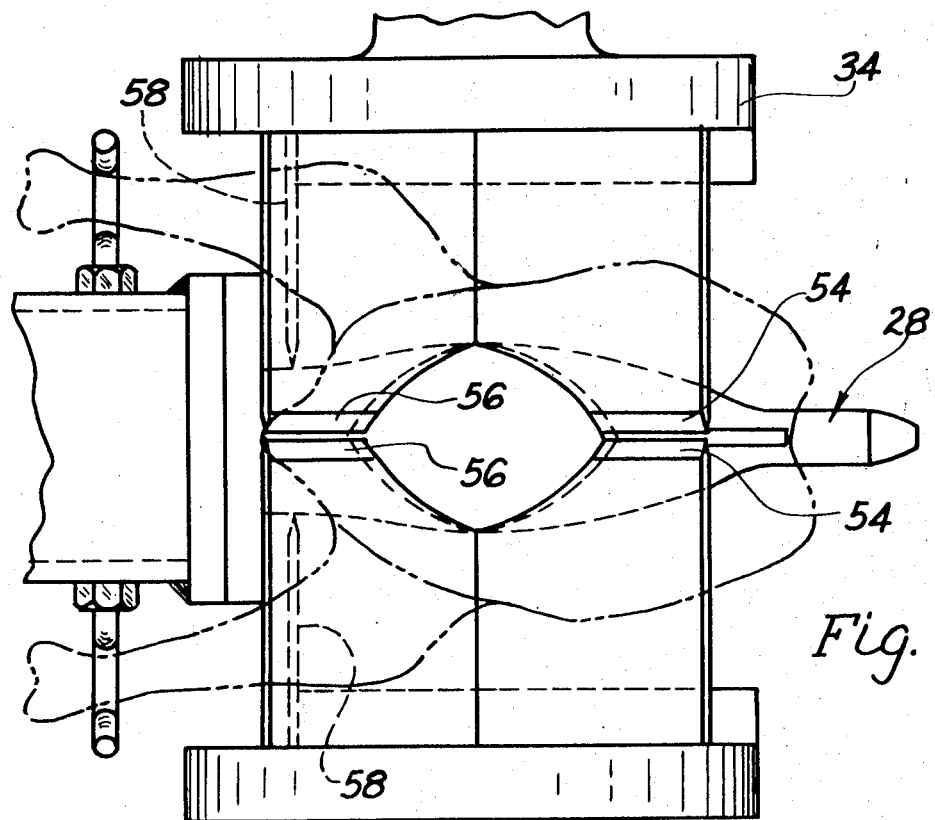
FIG. 3 is a top plan view of a portion of the apparatus shown in FIG. 1 illustrating one of the mandrels on which a poultry body is mounted and disposed at the cutting station.
Figure 4:
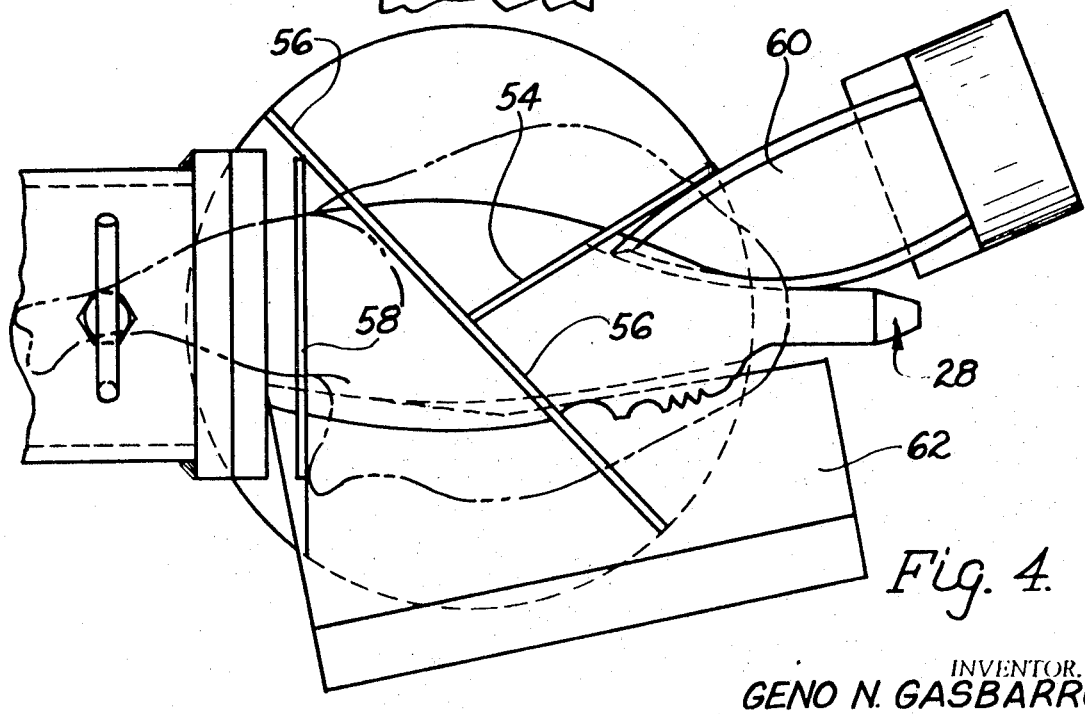
FIG. 4 is a side elevational view of that portion of the apparatus of FIG. 1 which is shown in FIG. 3.
Figure 9:
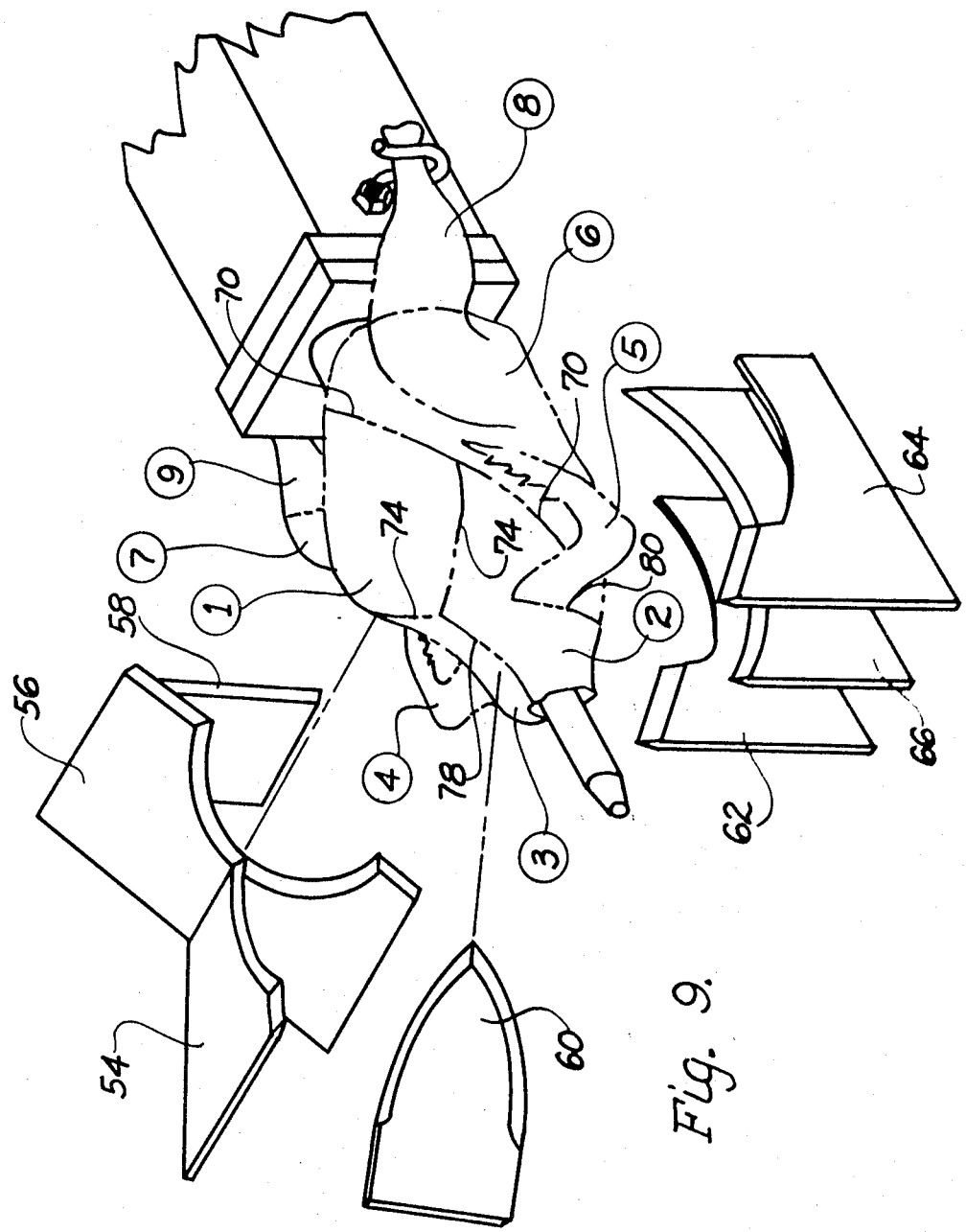
FIG. 9 is a partial perspective view similar to the view shown in FIG. 8 except a chicken body is illustrated in position on the mandrel.

Referring now to FIGS. 3 4 and 9 the positions of certain of the blades of the cutting means are illustrated relative to a chicken body positioned on a mandrel 28 which is disposed at the cutting station.

As seen in FIGS. 3, 4 and 9, blades 58 of side cutting means 34 and 36 are positioned to sever the respective leg portions 8 and 9 of the chicken. Respective blade 56 are positioned to make a cut along each side of the breast portion along slots 69 of mandrel 28 which coincide with a broken line 70 on each side of the body as seen in FIG. 9. The respective blades 54 are positioned to sever the breast along slot 72 in mandrel 28 which coincides with the broken line designated 74 in FIG. 9. In this manner one portion of the breast, commonly referred to as the keel, is severed from the remaining breast portion which is severed into two more pieces by the cut made by blade 60 along slot 76 in mandrel 28 which coincides with broken line 76 in FIG. 9. In this manner the breast of the chicken is cut into three separate pieces designated by numerals 1, 2 and 3.

It should be noted that blades 54 and 56 of cutting means 36 meet their respective blades 54 and 56 on cutting means 34 in an overlapping scissors action to assure that a clean cut is made.

Blades 62 and 64 of cutting means 40 are positioned to sever the wing portions 4 and 5, as shown in FIG. 1, from the chicken along broken lines 80. Blade 66 is designed to make a cut the entire length of the back of the chicken substantially along the centerline from front to rear which creates two additional pieces which includes the chicken thighs 6 and 7 along slot 75 in mandrel 28.

From the foregoing description, it should be readily understood that the whole chicken body is cut into nine predetermined pieces at one time upon the forward movement of cutting means 34, 36, 38 and 40 into engagement with the body positioned on the mandrel 28.

Figure 10:
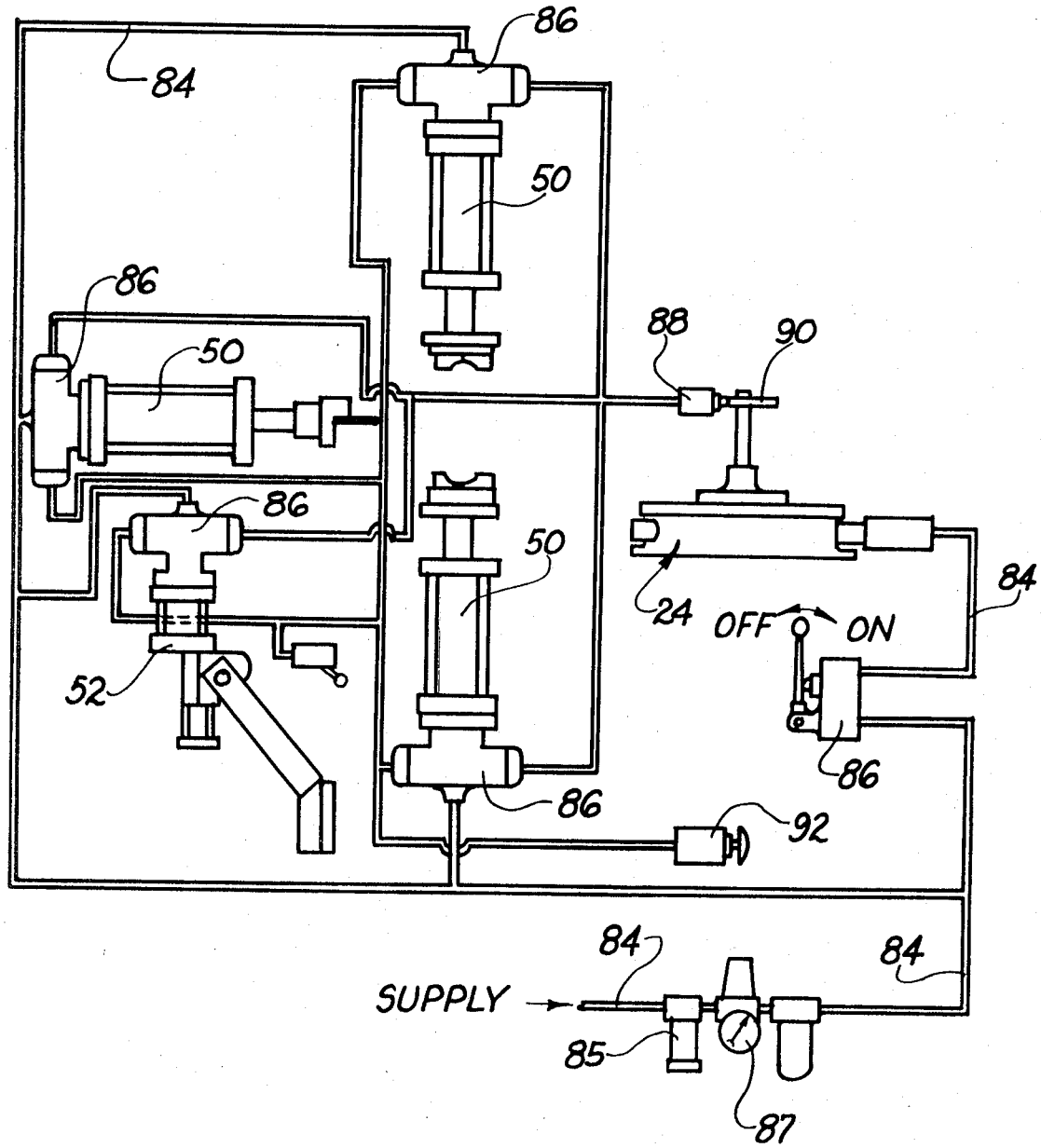
FIG. 10 is a diagrammatic view of a typical circuit constructed in accordance with the present invention.

Now referring to FIG. 10, a diagrammatic view of a typical pneumatic circuit constructed in accordance with the present invention is shown and includes a source of air pressure, not shown, connected to the main inlet supply line 84. A conventional air filter and pressure regulator 85 and 87 respectively communicate with the inlet supply.

Supply line 84 communicates with an on-off pneumatic switch 86 which is operatively connected to a conventional index table 24 which automatically controls the incremental advance of the mandrels 28.

Supply line 84 is also operatively connected to each of the conventional air cylinders 50 and the conventional rotac cylinder 52.

Each of the cylinders 50 and 52 are operatively connected to respective conventional pilot operated four-way air valve 86 which in turn are in communication with a starting valve 88 actuated in timed sequence by cam 90 which is coordinated with index table 24.

An emergency stop valve 92 is operatively connected to each of the air valves 86 as a safety measure and operates to immediately stop the automatic cutting cycle upon manual actuation.

In operation, a commercially dressed chicken body is manually loaded on one of the mandrels 28 which as previously described are designed to substantially conform to the inner body cavity of the chicken body. It is important to point out that this feature not only aids in the proper positioning of the body on each mandrel 28 but also tends to hold the poultry body in a fixed position on the mandrel during the cutting operation.

As the chicken body is disposed over the mandrel, each body tends to assume substantially an identical position relative to the mandrel body 28 which permits the cuts made by the blade to be substantially uniform.

After the first chicken body is loaded on a mandrel 28, the on-off valve is manually turned to the on position. The operator then merely continues to load the dressed bodies on each mandrel as the mandrels 28 advance. Since the incremental advance controlled by the index table moves each mandrel to the predetermined position adjacent the cutting means and the four-way air valves 86 are coordinated with the index table advance by the action of cam 90 and start valve 88, it should be readily understood that the cutting means are automatically actuated to move into engagement with the chicken body mounted on each mandrel 28 as each mandrel stops at the cutting station. As the cutting means 34, 36, 38 and 40 return to their original position, the mandrels 28 are again advanced another increment to sequentially move each mandrel to the cutting station and to the loading position.

As each station is cut into the predetermined pieces, the pieces merely fall away from the mandrel 28 upon which the chicken body was mounted. Preferably, a conveyor type system could be designed for the packaging and removal of the pieces.

While the form of embodiment of the present invention as herein disclosed constitutes a preferred form, it is to

I claim:

1. An automatic poultry cutting apparatus comprising, in combination, frame means; a poultry support member movably mounted on said frame means and including a plurality of spaced mandrels each adapted to receive a commercially dressed poultry body; power means operatively connected to said poultry support member for moving said support member; control means operatively connected to said power means for actuating the sequential advance of each of said mandrels to a predetermined position defining a cutting station; a plurality of cutting means mounted on said frame means adjacent to said cutting station and movable into force-transmitting engagement with a poultry body mounted on the mandrel positioned at said cutting station, each of said cutting means being configured to engage predetermined portions of said poultry body for severing said body into a plurality of predetermined pieces; drive means operatively connected to each of said cutting means for moving said cutting means into and out of engagement with a mandrel disposed at said cutting station; and switch means operatively connected to said drive means for synchronously actuating the movement of said cutting means at intervals coordinated with the advance of each mandrel to said cutting station.

2. The apparatus defined in claim 1 wherein said mandrels include a narrowed neck portion and an adjoining body portion, said body portion substantially conforming to the inner body cavity of a commercially dressed poultry body.

3. The apparatus defined in claim 1 wherein said plurality of cutting means include a pair of oppositely disposed side cutting members, each of which include at least three separate cutting blades, at least two of said cutting blades on each of said side members coordinated with a respective one of the cutting blades on the opposite side cutting member to sever a portion of the breast of the poultry body to separate the keel portion from the front portion of the chicken's breast.

4. The apparatus defined in claim 1 wherein said plurality of cutting means include a forwardly disposed member which includes at least one cutting blade adapted to engage the forward portion of the poultry body substantially along the centerline of the forward breast portion.

5. The apparatus defined in claim 1 wherein said plurality of cutting means includes a cutting member comprising at least three substantially parallel extending cutting blades, the outer most blades adapted to engage the wing portions closely adjacent to the poultry body, and the remaining cutting blade adapted to engage the back of the poultry body substantially along the centerline extending from the front to rear to separate the back portion substantially in half.

6. An automatic poultry cutting apparatus comprising, in combination, a frame means; a poultry support member mounted on said frame means and including a poultry retaining mandrel shaped to conform to the inner body cavity of a commercially dressed poultry body and adapted to receive said commercially dressed body thereon; a plurality of cutting means disposed adjacent to said poultry retaining mandrel and movably mounted for force-transmitting engagement with a poultry body mounted on said mandrel, each of said cutting means being configurated so as to engage predetermined portions of said poultry body for severing said body into a plurality of predetermined pieces, drive means operatively connected to each of said cutting means for moving said cutting-means into and out of engagement with said mandrel; and switch means operatively connected to said drive means to actuate the movement of said cutting means.

References Cited
UNITED STATES PATENTS

| | | | |
|---|---|---|---|
| 2,807,046 | 9/1957 | Hebenheimer | 17—11 |
| 2,941,238 | 6/1960 | Reeves | 17—11 |
| 3,177,520 | 4/1965 | Vogt et al. | 17—1 R |
| 3,564,644 | 2/1971 | Cannon | 17—11 |

LUCIE H. LAUDENSLAGER, Primary Examiner

U.S. Cl. X.R.

17—52